(12) United States Patent
Wajcer et al.

(10) Patent No.: US 8,644,866 B2
(45) Date of Patent: Feb. 4, 2014

(54) SATELLITE RECEIVER WITH INTERFERING SIGNAL CANCELLATION

(75) Inventors: Daniel Wajcer, Beit Yehoshua (IL); Guy Cohen, Herzliya (IL)

(73) Assignee: Novelsat Ltd., Ra'Anana (IL)

( * ) Notice: Subject to any disclaimer, the term of this patent is extended or adjusted under 35 U.S.C. 154(b) by 438 days.

(21) Appl. No.: 13/031,216

(22) Filed: Feb. 20, 2011

(65) Prior Publication Data

US 2012/0214524 A1 Aug. 23, 2012

(51) Int. Cl.
*H04B 7/00* (2006.01)
*H04B 15/00* (2006.01)

(52) U.S. Cl.
USPC ........................................................ 455/502

(58) Field of Classification Search
USPC .................. 455/63.1, 67.13, 139, 275, 276.1,
455/278.1, 283, 285, 115.1, 225, 296,
455/303–307, 16, 24, 62, 502; 375/346,
375/316, 347, 349, 350, 211, 214, 229, 232,
375/233

See application file for complete search history.

(56) References Cited

U.S. PATENT DOCUMENTS

| | | | |
|---|---|---|---|
| 5,596,439 A | 1/1997 | Dankberg et al. | |
| 6,011,952 A | 1/2000 | Dankberg et al. | |
| 6,418,161 B1 * | 7/2002 | Shively et al. | 375/222 |
| 6,466,958 B1 | 10/2002 | Van Wechel et al. | |
| 6,597,750 B1 | 7/2003 | Knutson et al. | |
| 6,675,307 B1 | 1/2004 | Heitkamp et al. | |
| 6,725,017 B2 | 4/2004 | Blount et al. | |
| 6,859,641 B2 | 2/2005 | Collins et al. | |
| 6,975,582 B1 * | 12/2005 | Karabinis et al. | 370/204 |
| 7,113,557 B2 | 9/2006 | Kaku et al. | |
| 7,228,104 B2 | 6/2007 | Collins et al. | |
| 7,782,935 B1 | 8/2010 | Wong et al. | |
| 2002/0098802 A1 | 7/2002 | Karabinis | |
| 2002/0110206 A1 | 8/2002 | Becker et al. | |
| 2003/0054762 A1 | 3/2003 | Karabinis | |
| 2004/0042561 A1 | 3/2004 | Ho et al. | |
| 2004/0042569 A1 | 3/2004 | Casabona et al. | |
| 2005/0190870 A1 * | 9/2005 | Blount et al. | 375/346 |
| 2006/0222113 A1 | 10/2006 | Harrison | |
| 2007/0066226 A1 * | 3/2007 | Cleveland et al. | 455/63.1 |
| 2009/0102706 A1 | 4/2009 | Goldblatt et al. | |
| 2009/0274202 A1 * | 11/2009 | Hanke et al. | 375/220 |
| 2011/0311007 A1 * | 12/2011 | Nuutinen et al. | 375/350 |

OTHER PUBLICATIONS

Verdu, S, "Multiuser Detection," Cambridge University Press, chapter 7, pp. 344-393, year 1998.
International Patent Application PCT/IB2012/050622 search report dated Jul. 19, 2012.

* cited by examiner

*Primary Examiner* — Sujatha Sharma
(74) *Attorney, Agent, or Firm* — D. Kligler I.P. Services Ltd.

(57) ABSTRACT

A method for communication includes receiving a Radio Frequency (RF) channel containing a desired signal conforming to a first air interface and an interfering signal conforming to a second air interface. A first receiver configured for the first air interface and a second receiver configured for the second air interface are synchronized to a common frequency and timing reference. While the first and second receivers are synchronized, the desired signal is decoded from the RF channel using the first receiver to generate a first output, the interfering signal is decoded from the RF channel using the second receiver to generate a second output, and the desired signal is reconstructed while suppressing the interfering signal by jointly processing the first and second outputs.

24 Claims, 7 Drawing Sheets

ND PATENT NO. US 8,644,866 B2

SATELLITE RECEIVER WITH INTERFERING SIGNAL CANCELLATION

FIELD OF THE INVENTION

The present invention relates generally to communication systems, and particularly to methods and systems for interference cancellation in communication receivers.

BACKGROUND OF THE INVENTION

Wireless communication systems are sometimes allocated shared or overlapping frequency bands. Overlapping allocations of this sort may cause interference from one communication system to another. For example, a terrestrial cellular system may cause interference to satellite communication receivers that operate in overlapping channels.

Various methods and systems for mitigating interference are known in the art. For example, U.S. Patent Application Publication 2002/0110206, whose disclosure is incorporated herein by reference, describes a combined interference cancellation communication system for satellite communications. A receiver receives a waveform having data information and noise information. A filter bank is coupled with the receiver to receive and filter waveform and output channel information received by the receiver. A demodulator provides an estimation signal representative of an estimation of at least one parameter of the channel information. Soft-input and soft-output decoders are provided to receive the channel information in order to calculate and estimate interference values based on the estimation signal. A soft-input and soft-output interference canceller receives the output channel information and the estimated interference value calculated from the decoders in order to provide a data signal substantially without interference.

U.S. Patent Application Publications 2004/0042569 and 2007/0098121, whose disclosures are incorporated herein by reference, describe an interference signal canceling system for canceling interference signals from earth station received signals using a two input adaptive cancellation network. Main and auxiliary signals are derived directly or by coherent conversion to intermediate frequency using an auxiliary antenna, cross-polarized feed, or auxiliary squinted feed. Filters set receive and canceling bands. Cancellation combines the main signal with a phase, amplitude and time modulated sample of the auxiliary signal. A receiver correlates the auxiliary signal with a sample of the combined output to minimize interference.

U.S. Patent Application Publication 2009/0102706, whose disclosure is incorporated herein by reference, describes a satellite interference canceling system that cancels interference between two or more signals received by a satellite receiver. Gain and phase are applied to the received signals and then combined with the other signals to result in cancellation by subtraction. The gain and phase values needed to cancel the interference are derived from measurements of Carrier-to-Noise ratio (C/N) as an indication of the interference level.

U.S. Pat. No. 6,597,750, whose disclosure is incorporated herein by reference, describes a system for receiving multiple broadcast channels transmitted with different polarizations. The system includes a first demodulator for demodulating a first channel having a first polarization to produce a first demodulated channel signal, and a second demodulator for demodulating a second channel having a second polarization, opposite to the first polarization, to produce a second demodulated channel signal. An adaptive interference cancellation network, coupled to the first and second demodulators, cancels interference, derived from the second channel, in the first demodulated channel signal to produce a received signal.

Verdú describes successive interference cancellation processes, in "Multiuser Detection," Cambridge University Press, November, 1998, chapter 7, which is incorporated herein by reference.

SUMMARY OF THE INVENTION

An embodiment of the present invention that is described herein provides a method for communication. The method includes receiving a Radio Frequency (RF) channel containing a desired signal conforming to a first air interface and an interfering signal conforming to a second air interface. A first receiver configured for the first air interface and a second receiver configured for the second air interface are synchronized to a common frequency and timing reference. While the first and second receivers are synchronized, the desired signal is decoded from the RF channel using the first receiver to generate a first output, the interfering signal is decoded from the RF channel using the second receiver to generate a second output, and the desired signal is reconstructed while suppressing the interfering signal by jointly processing the first and second outputs. In some embodiments, the second air interface is different from the first air interface.

In some embodiments, jointly processing the first and second outputs includes processing the second output so as to generate an adjusted second output that matches the first output in time and frequency, and combining the adjusted second output with the first output. Processing the second output may include accepting from the first and second receivers timing and frequency estimates regarding the desired signal and the interfering signal, respectively, and adjusting the second output based on the timing and frequency estimates.

In an embodiment, jointly processing the first and second outputs further includes processing the first output so as to generate an adjusted first output that matches the second output in time and frequency, and combining the adjusted first output with the second output. Jointly processing the first and second outputs includes evaluating a selection criterion in order to select between (i) a first order, in which the adjusted first output is initially generated and combined with the second output, and then the adjusted second output is generated and combined with the first output; and (ii) a second order, in which the adjusted second output is initially generated and combined with the first output, and then the adjusted first output is generated and combined with the second output. In a disclosed embodiment, jointly processing the first and second outputs includes alternating between adjustment of the first output and adjustment of the second output until meeting a termination criterion.

In another embodiment, decoding the desired signal includes producing a first weighted sum of multiple replicas of the RF channel received via multiple respective antennas and providing the first weighted sum as input to the first receiver, and decoding the interfering signal includes producing a second weighted sum of the multiple replicas of the RF channel and providing the second weighted sum as input to the second receiver. In yet another embodiment, reconstructing the desired signal includes extracting the interfering signal from an extraction point selected from a group of extraction points in the second receiver, and removing the extracted interfering signal from the desired signal at a cancellation point selected from a set of cancellation points in the first receiver.

In still another embodiment, the desired signal is received from a satellite, and the interfering signal is received from a terrestrial communication system. In a disclosed embodiment, receiving the RF channel includes receiving two or more interfering signals in addition to the desired signal, decoding the interfering signal includes decoding the two or more interfering signals using two or more respective second receivers that are synchronized to the common frequency and timing reference, to produce two or more second outputs, and jointly processing the first and second outputs includes reconstructing the desired signal while suppressing the two or more interfering signals. In an embodiment, jointly processing the first and second outputs includes selecting an order among the second outputs based on an ordering criterion, and combining the second outputs with the desired signal in accordance with the selected order.

There is additionally provided, in accordance with an embodiment of the present invention, a communication apparatus including a front end, first and second receivers, a reference unit and an interference generation unit. The front end is configured to receive a Radio Frequency (RF) channel containing a desired signal conforming to a first air interface and an interfering signal conforming to a second air interface. The first receiver is configured to reconstruct the desired signal from the RF channel by decoding the first air interface, to produce a first output. The second receiver is configured to reconstruct the interfering signal from the RF channel by decoding the second air interface, to produce a second output. The reference unit is configured to synchronize the first and second receivers to a common frequency and timing reference. The interference regeneration unit is configured to provide the second output to the first receiver, and to cause the first receiver to reconstruct the desired signal while suppressing the interfering signal.

The present invention will be more fully understood from the following detailed description of the embodiments thereof, taken together with the drawings in which:

DETAILED DESCRIPTION OF EMBODIMENTS

Overview

When multiple communication systems operate in overlapping frequency bands, transmissions of one system may cause interference in a receiver of the other system. For example, in some geographical regions WiMAX networks and direct-to-home satellite systems are allocated overlapping spectra. In such situations, a satellite receiver may suffer interference from a nearby WiMAX base station.

Embodiments of the present invention that are described herein provide improved methods and systems for reducing interference in communication receivers. The embodiments described herein refer mainly to reduction of interference in satellite terminals that is caused by cellular base stations. The disclosed techniques, however, can be used with any suitable desired signal and any suitable interfering signal.

In some embodiments, an interference-canceling receiver receives a desired signal and an interfering signal having respective (possibly different) air interfaces. The interference-canceling receiver comprises two receivers—a first receiver designed to decode the air interface of the desired signal, and a second receiver designed to decode the air interface of the interfering signal. The first receiver attempts to decode the desired signal in the presence of interfering signal components, while the second receiver attempts to decode the interfering signal (possibly in the presence of desired signal components). By jointly processing the outputs of the two receivers, the interference-canceling receiver is able to reconstruct the desired signal while suppressing the interference from the interfering signal.

In some embodiments, both receivers are synchronized to the same frequency and timing clock reference, even though the receivers are designed for different air interfaces. As a result, joint processing of the receiver outputs (e.g., subtraction of the output of the second receiver from the output of the first receiver) is considerably simplified. In some embodiments, the two receivers carry out a successive cancellation process in which each receiver refines the decoding of its respective signal based on the output of the other receiver.

The methods and systems described herein are highly effective in recovering the desired signal, even when it is considerably weaker than the interfering signal. The disclosed techniques are also useful for joint decoding of multiple desired signals that overlap in frequency, for example satellite signals having different (e.g., orthogonal) polarities that suffer from mutual interference due to cross-polarization leakage. Thus, the disclosed techniques increase the spectral efficiency and capacity of wireless communication systems.

In some embodiments, the techniques described herein can be used in existing receiver designs with minimal modifications, e.g., by reusing existing timing and frequency offset estimation mechanisms.

System Description

Figure 1:
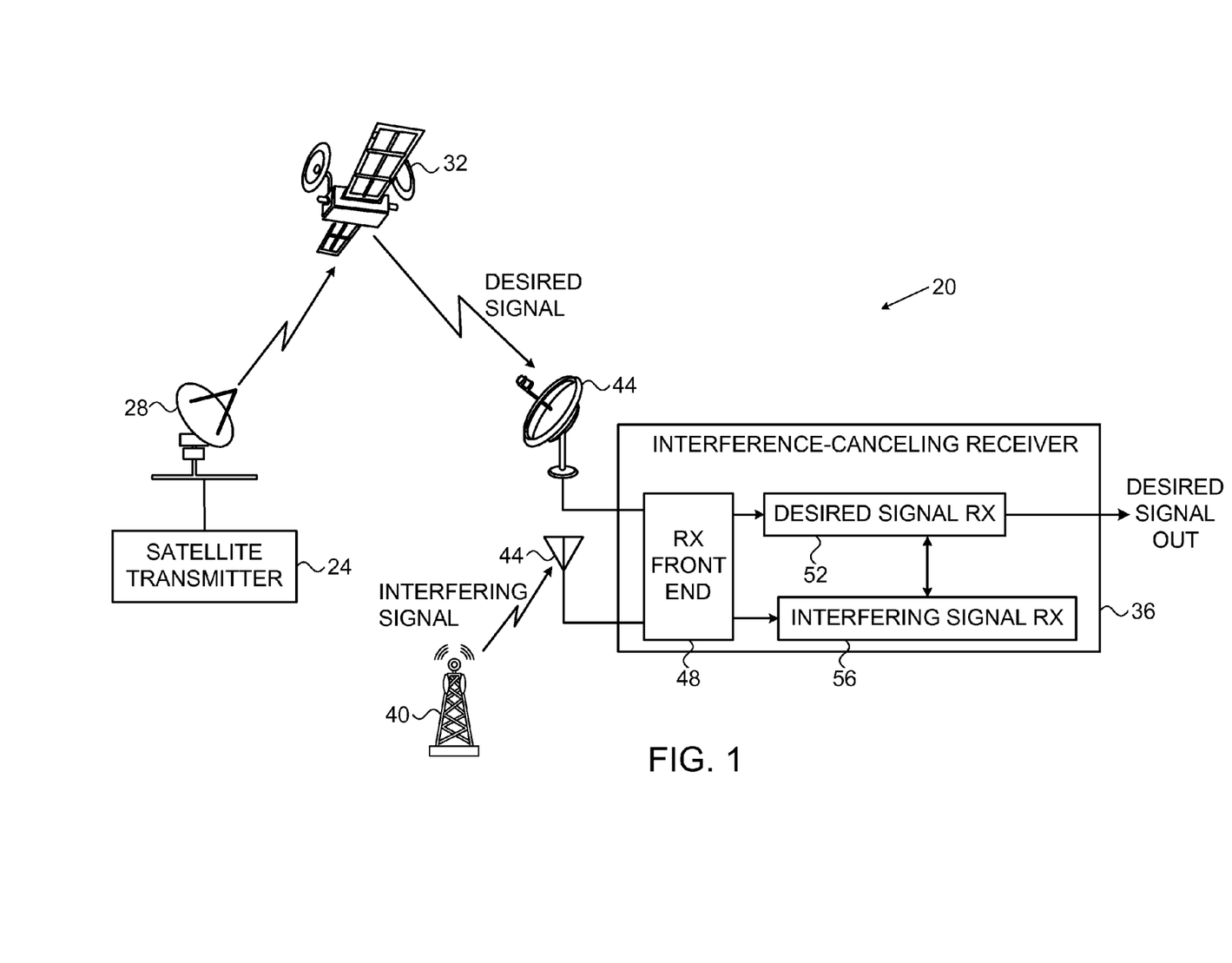
FIG. 1 is a block diagram that schematically illustrates a satellite communication system that applies interference cancellation, in accordance with an embodiment of the present invention.

FIG. 1 is a block diagram that schematically illustrates a satellite communication system 20 that applies interference cancellation, in accordance with an embodiment of the present invention. In system 20, a satellite transmitter 24 transmits an uplink Radio Frequency (RF) signal toward a satellite 32 using an antenna 28. The satellite converts this signal into a downlink RF signal, and transmits the downlink signal to an interference-canceling receiver 36. Receiver 36 is designed to receive the downlink signal (also referred to as a desired signal) while canceling interference caused by interfering signals. In the present example, the interfering signal originates from a nearby WiMAX (IEEE 802.16) base station 40. Example configurations of interference-canceling receivers and their components are described in detail below.

The desired signal and the interfering signal are assumed to originate from systems that overlap, at least partially, in frequency. For example, C-band frequencies in the range 3.65-3.70 GHz are sometimes allocated to direct-to-home satellite services and to WimMAX or Broadband Wireless Access (BWA) terrestrial systems in the same geographical regions. In these scenarios, a satellite reception terminal may suffer from interference from a nearby WiMAX base station or mobile station.

The interfering signal may alternatively comprise a Long Term Evolution (LTE) signal, a Wireless Local Area Network (WLAN) signal such as WiFi, a cordless phone signal, or any other suitable signal type. When the desired signal comprises a satellite signal, the interfering signal may comprise another satellite signal, e.g., a signal originating from the same satellite transponder as the desired signal or from another transponder, a signal having orthogonal polarity relative to the desired signal. In alternative embodiments, the desired and interfering signals may be produced by any other suitable systems and may operate in any other suitable frequency band. The source of the interfering signal need not necessarily be adjacent to receiver 36.

Interference-canceling receiver 36 comprises one or more receive antennas 44, each of which receives the desired and/or interfering signals. In some embodiments, one of antennas 44 comprises a directional antenna (e.g., dish) that is pointed toward satellite 32 in order to receive the desired signal, but nevertheless receives the interfering signal to some extent. In some embodiments, one of antennas 44 receives only the interfering signal and not the desired signal. In some embodiments, each of antennas 44 receives both the desired signal and the interfering signal to some extent. In some embodiments, receiver 36 comprises only a single antenna 44. The antennas may be collocated or located at different locations. Further alternatively, any other suitable configuration of one or more antennas 44 can be used.

A receiver (RX) front end 48 receives the signals from antennas 44 and extracts the appropriate RF channel or channels. Typically, the front end performs low-noise amplification, down-conversion to Intermediate Frequency (IF) and tuning to the desired channel or channels. Respective outputs of front end 48 are provided to a desired signal receiver 52 and to an interfering signal receiver 56. Receivers 52 and 56 may be collocated or separate.

In the embodiments described herein, the desired signal and the interfering signals comply with different air interfaces. The term "air interface" refers to the physical-layer signals and protocols that are used for encoding, modulation and transmission. The air interface (also sometimes referred to as "physical layer" or "PHY") typically defines features such as pulse shape, modulation scheme, Forward Error Correction (FEC), channel multiplexing scheme and radio channel structure of the signal.

Desired signal receiver 52 is designed to decode the air interface of the desired signal, and interfering signal receiver 56 is designed to decode the air interface of the interfering signal. Receiver 52 comprises a satellite receiver that complies with the air interface used by transmitter 24, such as a Digital Video Broadcasting—Second Generation (DVB-S2) receiver, or a receiver of any other suitable air interface. Receiver 56 may comprise a WiMAX receiver, or a Receiver of any other suitable air interface.

In each of the two receivers, the modulation type may comprise a certain single-carrier modulation, Orthogonal Frequency Division Multiplexing (OFDM), Orthogonal Frequency Division Multiple Access (OFDMA), spread-spectrum modulation, or any other suitable modulation type. The air interfaces in any of the two receivers may specify continuous transmission or transmission in bursts. Typically, receivers 52 and 56 are synchronized to the same frequency and timing reference.

In some embodiments, receiver 52 cancels the interference that is caused by the interfering signal. In an embodiment, receiver 52 cancels the interference by combining (e.g., adding or subtracting) a version of the interfering signal, as produced by receiver 56, with the desired signal. In some embodiments, receivers 52 and 56 carry out a successive decoding process in which each receiver refines the decoding of its respective signal based on the output of the other receiver. In other words, receiver 52 may refine the decoding of the desired signal based on the decoded interfering signal produced by receiver 56, and receiver 56 may refine the decoding of the interfering signal based on the decoded desired signal produced by receiver 52. Any suitable number of decoding iterations, and possibly only a single refinement, may be performed. The decoding may initiate with decoding of the desired signal first, or with decoding of the interfering signal first. The resulting desired signal is provided as output.

Figure 2:
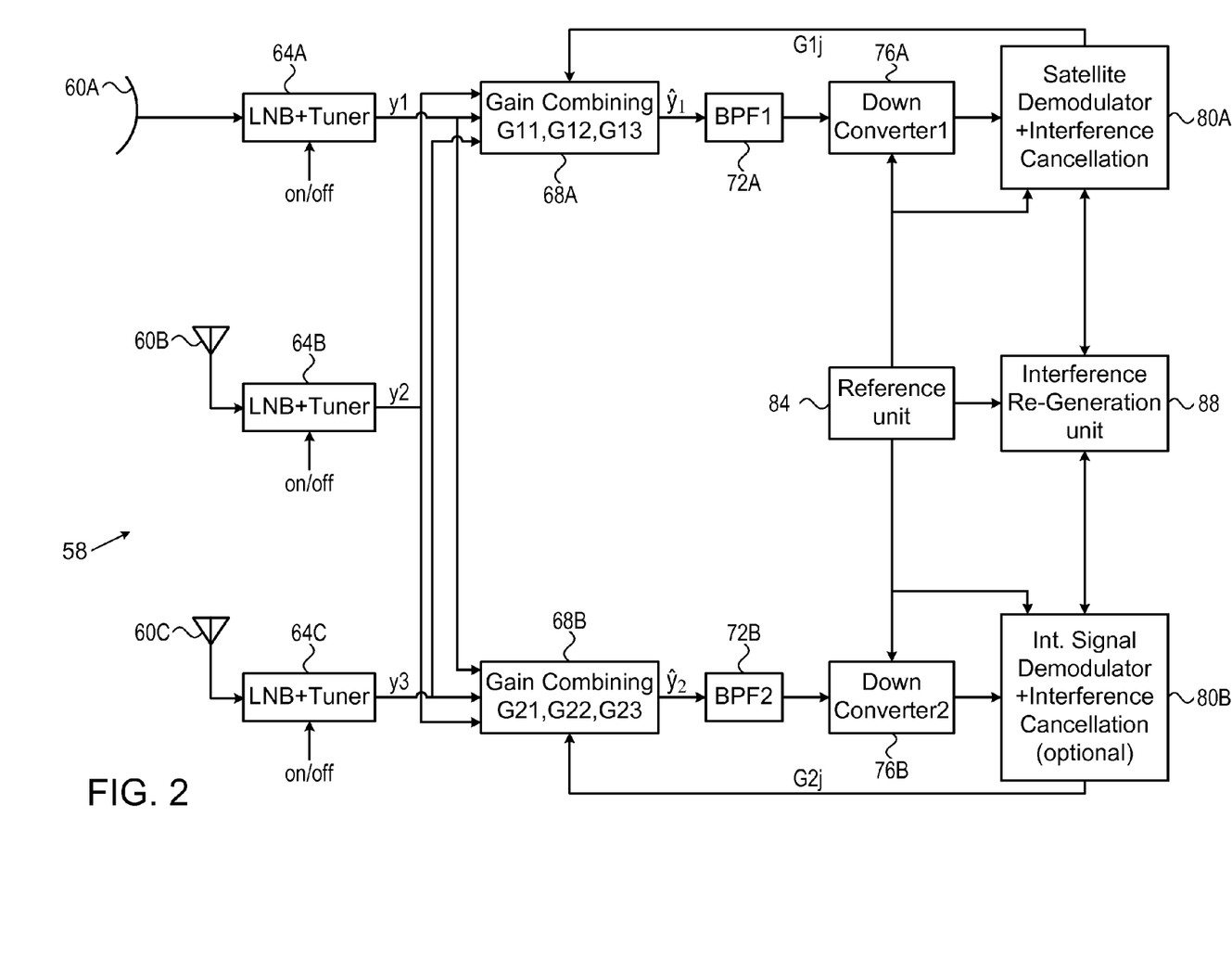
FIG. 2 is a block diagram that schematically illustrates an interference-canceling receiver, in accordance with an embodiment of the present invention.

FIG. 2 is a block diagram that schematically illustrates an interference-canceling receiver 58, in accordance with an embodiment of the present invention. The configuration of receiver 58 can be used for implementing receiver 36 of FIG. 1 above. In the example of FIG. 2, receiver 58 comprises three receive antennas 60A . . . 60C. Antenna 60A comprises a directional dish antenna that is pointed toward satellite 32. Nevertheless, antenna 60A receives the interfering signal in addition to the desired signal, e.g., via a side-lobe or back-lobe. Antennas 60B and 60C, which may be directional or omnidirectional, receive the interfering signal and possibly the desired signal.

In the present example, the RX front end comprises three Low Noise Blocks (LNBs)/tuners 64A . . . 64C that are connected to antennas 60A . . . 60C. Each LNB/tuner processes the RF signal received by its respective antenna. A given LNB/tuner amplifies the received signal and converts the signal from RF to IF while filtering the desired RF channel. The outputs of LNB/tuners 64A . . . 64C are denoted y1 . . . y3, respectively. In some embodiments, each LNB/tuner can be activated or deactivated using an on/off interface, in order to train subsequent receiver elements (e.g., Automatic Gain Control—AGC) for each received signal separately.

The output of the $i^{th}$ LNB/tuner is given by:

$$y_i = g_{i1}x_{i1} + g_{i2}x_{i2} + n_i \qquad [1]$$

wherein $x_{i1}$ denotes the desired signal after channel filtering, $x_{i2}$ denotes the interfering signal after channel filtering, $n_i$ denotes Additive Gaussian White Noise (AWGN), and $g_{i1}$ and $g_{i2}$ indicate the complex gains at which the $i^{th}$ antenna receives the desired and interfering signals, respectively.

In the embodiment of FIG. 2, the desired signal receiver comprises a gain combining module 68A, a Band Pass Filter (BPF) 72A, a down-converter 76A and a demodulator 80A. The interfering signal receiver comprises a gain combining module 68B, a BPF 72B, a down-converter 76B and a demodulator 80B. Each gain combining module combines the outputs of LNB/tuners 64A . . . 64C with respective weight coefficients. The output of the $i^{th}$ gain combiner is given by:

$$\hat{y}_i = \sum_i G_{ji} \cdot y_i \quad [2]$$

wherein $G_{ji}$ denotes the weight coefficient that multiplies the signal of the $j^{th}$ antenna in the $i^{th}$ gain combining module. In the present example, modules 68A and 68B perform analog gain combining. Alternatively, however, digital gain combining following sampling of the signals can also be used.

Gain combining modules 68A and 68B are controlled by demodulators 80A and 80B, respectively. In particular, the demodulators calculate the weight coefficients $G_{ji}$. Example techniques for calculating the weight coefficients are described further below.

The output of gain combining module 68A ($\hat{y}_1$) is filtered by a Band Pass Filter (BPF) 72A, which removes out-of-band signal components. In a satellite receiver, for example, the pass-band of BPF 72A typically corresponds to the bandwidth of a single satellite transponder. The BPS may filter out a portion of the interfering signal. A down-converter 76A down-converts the output of BPF 72A to baseband. A demodulator 80A decodes and reconstructs the desired signal. The output of gain combining module 68B ($\hat{y}_2$) is filtered by a BPF 72B. A down-converter 76B down-converts the output of BPF 72B to baseband. A demodulator 80B decodes and reconstructs the interfering signal.

Interference-canceling receiver 58 comprises an interference generation unit 88, which exchanges signals and associated information between demodulators 80A and 80B in order to perform interference cancellation. In some embodiments, demodulator 80B provides unit 88 with a version of the interfering signal that is extracted from some point along the reception path of demodulator 80B, as will be explained below. In addition, each demodulator (80A and 80B) provides unit 88 with frequency and timing information regarding its signal (e.g., residual frequency offset and timing estimate). Unit 88 uses the timing and frequency information to generate a version of the interfering signal, which is synchronized in time and frequency with the desired signal that is reproduced by demodulator 80A. Unit 88 provides this synchronized version of the interfering signal to demodulator 80A, which in turn subtracts it from the desired signal (or otherwise combines it with the desired signal).

In the above-described embodiment, only demodulator 80A of the desired signal has signal cancellation functionality for subtracting the interfering signal from the desired signal. In alternative embodiments, both demodulators (80A and 80B) have signal cancellation functionality, and the two demodulators carry out a successive decoding process that iteratively refines the decoded signals. In these embodiments, demodulator 80A provides unit 88 with a version of the desired signal that is extracted from some point in the reception path (in addition to demodulator 80B providing a version of the interfering signal). Both demodulators provide unit 88 with timing and frequency information regarding their respective signals.

Using this information, unit 88 generates a version of the desired signal that is synchronized (matched) in time and frequency with the interfering signal reproduced by demodulator 80B. Unit 88 provides the synchronized version of the desired signal to demodulator 80B, and demodulator 80B subtracts this signal from the interfering signal. As a result, the interfering signal is reproduced by demodulator 80B with improved accuracy.

The successive decoding process performed by demodulators 80A and 80B and unit 88 may proceed iteratively for any suitable number of iterations. In each iteration, the signal reproduced by one demodulator is refined using the signal reproduced by the other demodulator. The process may initiate either with reproducing the desired signal first, or with reproducing the interfering signal first.

In some embodiments, the initial iteration is performed by the demodulator exhibiting the higher effective Signal to Noise Ratio (SNR), after gain combining by modules 68A and 68B, and while regarding the interference from the other signal as additional noise. In alternative embodiments, the initial iteration is performed by the demodulator exhibiting the lower Bit Error Rate (BER), after gain combining and while regarding the interference from the other signal as additional noise, and while taking into account the modulation and code rate used by both demodulators. Further alternatively, the demodulator for performing the initial iteration can be selected arbitrarily, or using any other suitable criterion. As seen from the above example, the decoding order may be fixed, or it may vary from one decoding session to another.

Any suitable termination criterion can be used for terminating the successive interference canceling process. In one embodiment, the process continues for a predefined number of iterations. In another embodiment, the process is terminated when the quality of the reconstructed desired signal meets a certain target quality. For example, the process may be terminated when the Error Vector Magnitude (EVM) or the BER of the desired signal is below a certain threshold.

Typically, the desired signal receiver and the interfering signal receiver are synchronized in time and frequency to a common reference. This synchronization causes the timing and frequency information (e.g., residual frequency offset and timing estimate) reported by demodulators 80A and 80B to remain valid over a long time period. Thus, the signals generated by interference regeneration unit 88 will also remain valid for a long time period, and the signal cancellation performed by demodulator 80A (and in some embodiments also by demodulator 80B) will be accurate.

In some embodiments, interference-canceling receiver comprises a reference unit 84 that synchronizes the two receivers in time and frequency. This synchronization means that the relative carrier offsets and the timing clock frequency are synchronized in the two receivers. In the present example, unit 84 generates clock and reset signals for down-converters 76A and 76B, demodulators 80A and 80B and interference regeneration unit 88. The clock and reset signals provided to all these modules are synchronized to the same reference clock. Thus, all the Local Oscillator (LO) signals and the Analog-to-Digital Converter (ADC) sampling clocks in receiver 58 are synchronized to the same reference clock. In other words, all frequency conversion operations and sampling operations in receiver 58 are synchronized to the same reference clock. Using the common reset signal, receivers 52 and 56 also have a common timing reference.

In a typical embodiment, the desired signal and the interfering signal originate from different transmitters, which are not synchronized with one another in any way and typically have different air interfaces. In order to perform interference cancellation, offsets between the carrier frequencies and timing clock frequencies of the two signals should be estimated and compensated for. As will be described below, in some embodiments these estimations are carried out in the desired signal receiver and the interfering signal receiver, and unit 88 cancels the interference using the receiver estimates without adding dedicated estimation or synchronization mechanisms. Unit 88 is able to use the receiver estimates since the receivers are synchronized to one another by unit 84.

Example Demodulator and Interference Regeneration Unit Configurations

Figure 3:
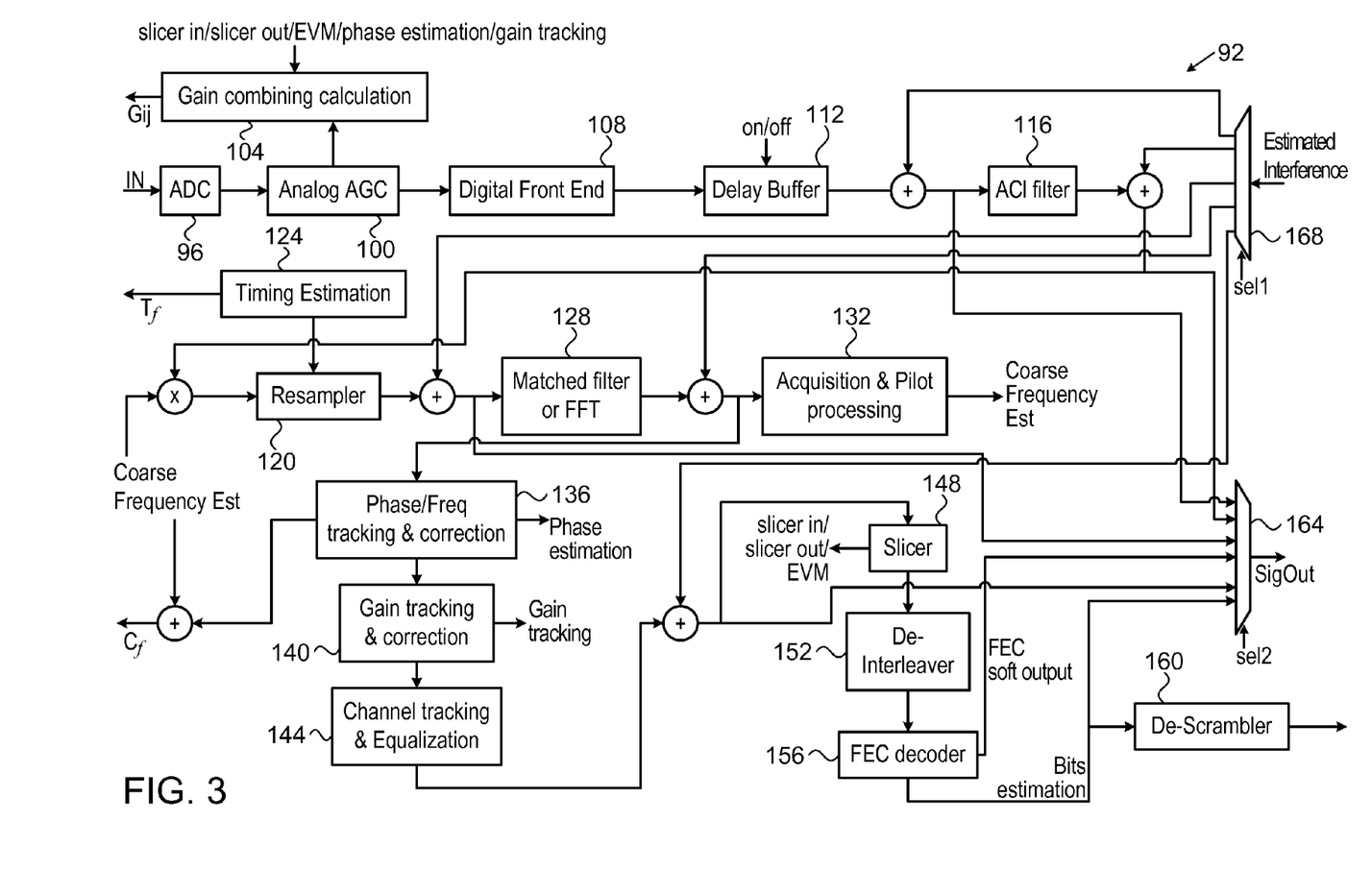
FIG. 3 is a block diagram that schematically illustrates a demodulator in an interference-canceling receiver, in accordance with an embodiment of the present invention.

FIG. 3 is a block diagram that schematically illustrates a demodulator 92 in an interference-canceling receiver, in accordance with an embodiment of the present invention. The configuration of demodulator 92 can be used, for example, for implementing demodulator 80A or 80B of FIG. 2 above.

The reception path in demodulator 92 begins with an ADC 96, which accepts an analog baseband signal and samples the analog signal to produce a digital baseband signal. An analog AGC module 100 controls the signal gain. A gain combining calculation module 104 calculates the weight coefficients $G_{ji}$ that are applied by the respective gain combining module (module 68A or 68B in FIG. 2 above). The weight coefficient calculation may be based, for example, on soft signal values at the input to a slicer that makes bit decisions (see below), on hard bit values at the slicer output, on EVM measured at the slicer, on an estimate signal phase, on an estimated signal gain, and/or on any other suitable parameter.

In some embodiments, interference-canceling demodulator 92 calculates the weight coefficients using a Maximum Ratio Combining (MRC) process. In an example embodiment, demodulator 92 carries out the following MRC process: In the receiver that performs the initial decoding iteration, without interference cancellation:

1) Freeze the analog AGC (module 100 in FIG. 3).
2) Activate the LNB/tuner of one receive antenna (e.g., LNB/tuner 64A) and deactivate all other LNB/tuners.
3) At the slicer input, measure the EVM that results from both the additive noise and the interference.
4) Measure the average power of the received signal, denoted $P_{11}$, according to the gain tracking reading.
5) Measure the receiver phase estimation, denoted $\theta_{11}$.
6) The noise variance estimation is given by $\sigma_{11}^2 = P_{11}/(1+SNR_{11})$.
7) Set $G_{11} = e^{-j\theta} \cdot \sqrt{SNR_{11}/\sigma_{11}^2}$, wherein G comprises a complex gain.
8) Repeat steps 2-7 for each receive antenna (each LNB/tuner) with the other LNB/tuners deactivated, for setting the remaining weight coefficients.

In the receiver that carries out the second decoding iteration, with interference cancellation:

9) For each of the subsequent measurements, activate the interference cancellation mechanism and let it converge. After convergence, the measured EVM results substantially only from the additive noise.
10) Repeat steps 2-8 in the second receiver for setting the weight coefficients.
11) Activate the analog AGC (module 100) and scale the previous calculations according to the analog AGC gain.

In an alternative embodiment, the above-described MRC process can be carried out using real (as opposed to complex) gain, and without the phase rotation. In another embodiment, the weight coefficient of each receive antenna can be set proportionally to the power of the signal received by that antenna. In yet another embodiment, the weight coefficients can be set using Equal Gain Combining (EGC), in which the amplitudes of all weight coefficients are equal, and the weight coefficients compensate for phase rotation only. Further alternatively, demodulator 92 may calculate and set weight coefficients $G_{ji}$ using any other suitable technique.

Following the analog AGC, a digital front end 108 decimates the signal, to produce a baseband signal having a lower sampling rate. Decimation may be performed in a single stage or in multiple successive stages. Each decimation stage typically performs both filtering and decimation of the signal. Filtering is important to prevent aliasing. The signal produced by digital front end 108 is delayed using a delay buffer 112. Buffer 112 is typically disabled (e.g., bypassed) in the receiver that performs the initial decoding iteration, and is activated in the other receiver. The delay of buffer 112 provides sufficient time for the first receiver and the interference regeneration to generate the interference signal for cancellation.

The output of delay buffer 112 is filtered by an Adjacent Channel Interference (ACI) filter 116. The ACI filter typically filters-out neighboring channels. A resampler 120 resamples the signal at the output of ACI filter 116. The resampler resamples the signal at optimal sampling rate and times, as indicated by a timing estimation module 124.

Module 124 estimates the optimal sampling times within the symbols in the signal, in order to optimize the resulting receiver performance (e.g., to minimize EVM at the slicer input). In an embodiment, module 124 initializes the timing estimation according to an initial timing estimation obtained from an acquisition module 132, described further below. The timing estimation may train, for example, based on slicer errors calculated on data symbols, slicer errors calculated on pilot symbols, correlation between the received samples and a known training sequence, slicer decisions (e.g., using Mueller-Muller timing loop), received samples (blind estimation, such as using a Gardner timing loop), phase slope along bins in case of OFDM modulation, or based on any other suitable parameters. In case of OFDM modulation, residual timing correction may be corrected in the frequency domain following a subsequent FFT module—described below.

In some embodiments, module 124 provides the estimated timing frequency offset (clock frequency offset), denoted $T_f$, as output. This output is provided to interference regeneration unit 88 for use in the interference cancellation process, as described above.

Following resampling, the signal is processed by a matched filter or Fast Fourier Transform (FFT) module 128. A matched filter is typically used for single-carrier modulation. An FFT is typically used for OFDM or OFDMA modulation. In either case, the output of module 128 comprises a sequence of reconstructed constellation symbols. The reconstructed symbols are provided to the subsequent modules along the reception path, and to an acquisition and pilot processing module 132.

Module 132 typically estimates the initial frequency offset of the received symbols. The estimation may be performed, for example, once per a transmission burst (when the air interface defines transmission in bursts), once per frame or during first startup (for a continuous transmission air interface such as DVB-S2), or whenever data (e.g., pilot symbols) is available for training. The estimation process may involve, for example, signal auto-correction, cross-correction with expected training data, channel and gain estimation according to expected training data, frequency estimation according to phase estimation at different locations, estimation of phase slope and rotation of OFDM bins, estimation of amplitude distortion of known OFDM bins, and/or any other suitable estimation technique.

Subsequently along the reception path, the signal is processed by a phase/frequency tracking & correction module 136, a gain tracking & correction module 140 and a channel tracking & equalization module 144. In some embodiments, phase/frequency tracking (carrier tracking) in module 136 is initialized by the frequency and phase estimation obtained from acquisition module 132 and then applied to the reconstructed symbols. Module 136 then continues to track the phase/frequency of the reconstructed symbols in order to fix residual phase/frequency errors, possible Doppler effects and phase noise. Training of phase/frequency tracking may be based, for example, on slicer errors according to slicer decisions, or on known pilot symbols.

In some embodiments, module 136 provides the estimated frequency error, denoted $C_f$, as output. This output is provided to interference regeneration unit 88 for use in the interference cancellation process, as described above.

In some embodiments, gain tracking and correction in module 140 is initialized by gain estimation that is obtained from acquisition module 132, and then applied to the reconstructed symbols. Module 140 then continues to track the gain of the reconstructed symbols in order to fix residual gain errors. Training of gain tracking may be based, for example, on slicer errors according to slicer decisions, or on known pilot symbols.

In some embodiments, channel tracking and equalization in module 144 may be initialized by a channel estimation obtained from acquisition module 132, and then applied to the reconstructed symbols. Module 144 then continues to track the channel response on the reconstructed symbols, in order to fix residual errors and channel variations. Training of channel tracking may be based, for example, on slicer errors according to slicer decisions, or on known pilot symbols.

Equalization in module 144 may be carried out, for example, using a time-domain equalizer such as a symbol-spaced equalizer, a fractionally-spaced equalizer, a Feed Forward Equalizer (FFE), a Decision Feedback Equalizer (DFE), a Maximum Likelihood Sequence Estimator (MLSE) or a sub-optimal MLSE. The time-domain equalizer may comprise real or complex tap coefficients. Alternatively, equalization in module 144 may be performed using a frequency-domain equalizer such as a single-tap-per-bin equalizer, an equalizer having multiple taps per bin, using coefficient smoothing in the time domain, using coefficient smoothing in the frequency domain, or using any other suitable equalizer.

When the equalizer in module 144 is implemented in the time domain, its main tap may be set to unity. In this embodiment, the phase rotation and gain correction are typically performed separately. When the main equalizer tap is complex, the equalizer and equalizer training may also perform phase and gain corrections. When equalization is performed in the frequency domain, the equalizer typically also performs the phase correction, and therefore separate phase estimation is not required. The equalizer may also perform gain correction instead of module 140.

Following phase/frequency, gain and channel correction, the signal is provided to a slicer 148. The slicer accepts as input soft symbols, and outputs respective hard symbols according to the symbol constellation of the modulation scheme used by the receiver. Typically, slicer 148 also outputs the slicer errors, i.e., the difference between the respective slicer output (hard) and input (soft) symbols. Additionally or alternatively, the slicer also calculates and outputs an estimate of the EVM.

The symbols at the slicer output are de-interleaved by a de-interleaver 152, which re-orders the data. The de-interleaver typically reverses the operation of an interleaver in the transmitter. The de-interleaver may operate on bits, symbols or any other soft data, such as Log Likelihood Ratios (LLR). The de-interleaver may comprise, for example, a block or convolution de-interleaver.

A Forward Error Correction (FEC) decoder 156 decodes a FEC code that is used by the transmitter to encode the data. The FEC decoder thus outputs a sequence of bits that estimate the data bits encoded by the transmitter. The FEC decoder may comprise, for example, a soft-input or hard-input decoder. The FEC code may comprise any suitable code, such as, for example, a Low Density Parity Check (LDPC) code, a Reed Solomon (RS) code, a convolutional code, a Turbo code, a Bose-Chaudhuri-Hocquenghem (BCH) code, a combination of such codes, or any other suitable FEC code. In addition to estimating the decoded bits, the FEC decoder may also output soft outputs such as soft estimates of the transmitted symbols. A de-scrambling module 160 applies a de-scrambling operation to the decoded bits.

In some embodiments, demodulator 92 outputs an additional output denoted SigOut (in addition to the reconstructed signal produced by module 160). Output SigOut is provided to interference regeneration unit 88 for interference cancellation purposes, i.e., for subtraction from the signal received by the other demodulator. As explained above, unit 88 converts this signal into a signal that is matched in time and frequency to the received signal of the other receiver, in order to enable accurate interference cancellation. In interference-canceling receivers that perform successive decoding, this functionality is supported in both the desired signal receiver and the interfering signal receiver. In interference-canceling receivers that do not perform successive decoding, this functionality is supported only in the interfering signal receiver.

In some embodiments, demodulator 92 can be configured to extract SigOut from various points along the reception path. The selected SigOut may comprise, for example, a baseband signal (a sequence of baseband samples) or decoded bits, depending on the selected extraction point. In the present example, demodulator 92 comprises a multiplexer 164, which selects the desired output SigOut in response to a control signal denoted sel2.

Possible extraction points of the output SigOut may comprise, for example, the output of the Delay Buffer 112, the output of ACI filter 116 (after removal of irrelevant out-of-band signal components), the output of resampler 120 (so as to provide an output signal that is sampled at the correct timing), the soft symbols at the input of slicer 148, the soft symbols as estimated by FEC decoder 156, or the decoded bits produced FEC decoder 156.

In some embodiments, selection of the desired extraction point of SigOut is performed during initialization or factory setting. In alternative embodiments, the desired SigOut may be selected and modified automatically during operation, e.g., by the interference regeneration unit, based on any suitable criterion.

In some embodiments, demodulator 92 accepts an estimate of the signal received by the other receiver (denoted "Estimated Interference" in the figure), and subtracts this signal from the received signal in order to perform interference cancellation. In interference-canceling receivers that perform successive decoding, this functionality is supported in both the desired signal receiver and the interfering signal receiver. In interference-canceling receivers that do not perform successive decoding, this functionality is supported only in the desired signal receiver.

In some embodiments, demodulator 92 can be configured to subtract the estimated interference at various subtraction points along the reception path. In the present example, demodulator 92 comprises a multiplexer 168, which selects the desired subtraction point in response to a control signal denoted sel1. Possible subtraction points may comprise, for example, the output of Delay Buffer 112, the output of ACI filter 116, the output of resampler 120, the output of matched filter/FFT module 128, or the input of slicer 148 (after equalization by module 144).

In some embodiments, selection of the desired interference subtraction point is performed during initialization or factory setting. In alternative embodiments, the desired subtraction point may be selected and modified automatically during operation, e.g., by the interference regeneration unit, based on any suitable criterion.

Figure 4:
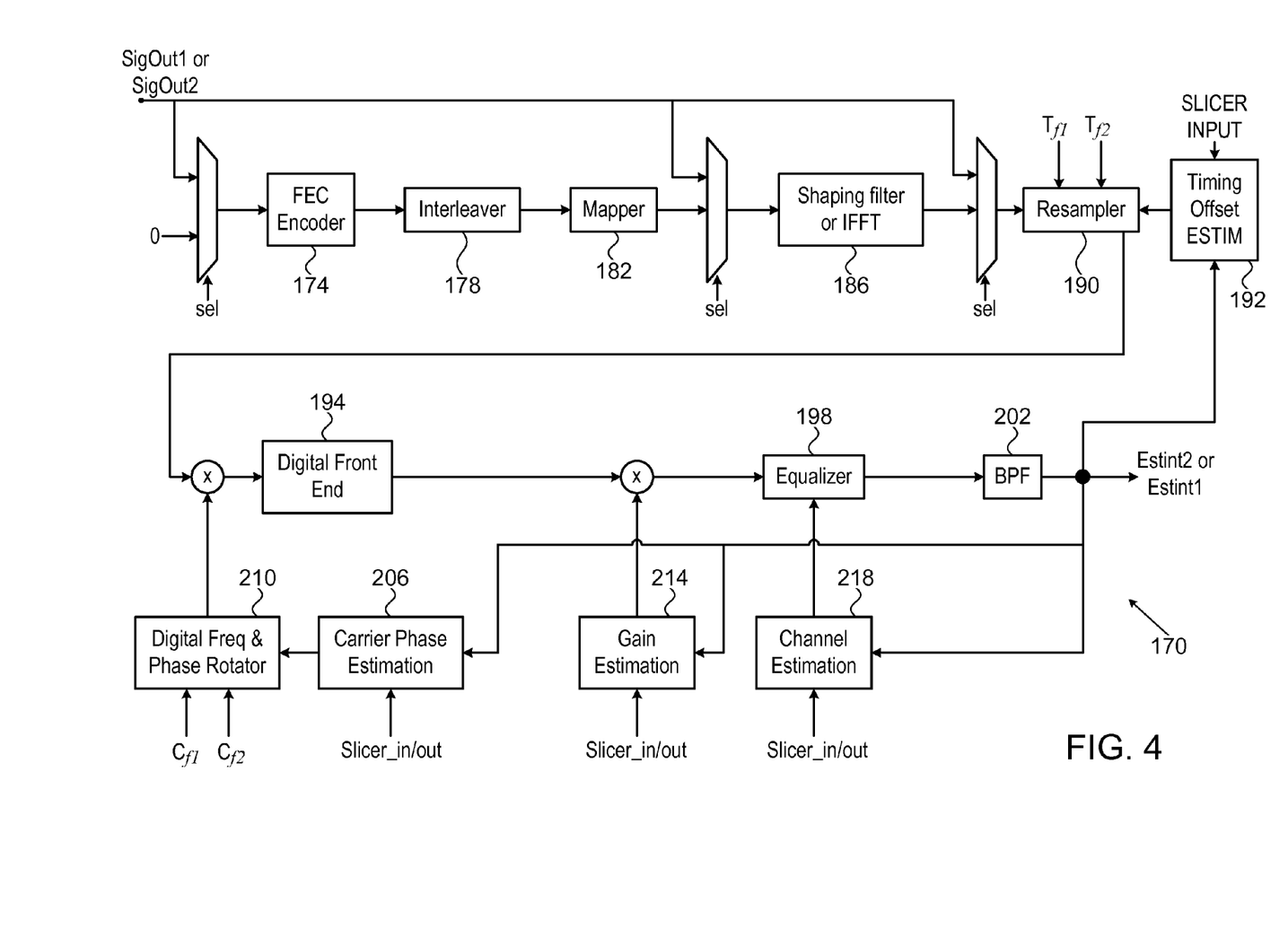
FIG. 4 is a block diagram that schematically illustrates an interference regeneration unit, in accordance with an embodiment of the present invention.

FIG. 4 is a block diagram that schematically illustrates an interference regeneration unit 170, in accordance with an embodiment of the present invention. The configuration of unit 170 may be used, for example, for implementing unit 88 of FIG. 2 above, Unit 170 accepts an input signal from one of the demodulators (e.g., signal SigOut from a demodulator 92 as shown in FIG. 3), converts the signal into a version that is matched in time and frequency to the signal received by the other demodulator (e.g., another demodulator 92 as shown in FIG. 3), and provides the signal to the other demodulator (e.g., as the "Estimated Interference" input to demodulator 92 in FIG. 3) for performing interference cancellation.

The input to unit 170 is denoted SigOut1 or SigOut2, depending on whether it originates from the demodulator of the desired signal or from the demodulator of the interfering signal. The output of unit 170 is denoted Estint1 or Estint2, depending on whether it is destined to the demodulator of the interfering signal or from the demodulator of the desired signal.

Unit 170 comprises a signal generation path, which comprises a FEC encoder 174, an interleaver 178, a mapper 182, a shaping filter or Inverse FFT (IFFT) module 186, a resampler 190, a digital front end 194, an equalizer 198 and a BPF 202. In the present example, unit 170 can be configured to accept the signal SigOut at various points along the signal generation path, using a control signal denoted sel. In the present example, SigOut can be injected either at the input of FEC decoder 174, at the input of shaping filter/IFFT module 186, or at the input of resampler 190. The choice of injection point typically depends on the extraction point from which SigOut was extracted in the first demodulator.

In some embodiments, unit 170 can be configured to output the signal Estint from various points along the signal generation path, using logic that is not shown in this figure. The choice of extraction point of Estint typically depends on the point at which Estint is to be subtracted in the second demodulator. In some embodiments, the various elements of unit (e.g., resampler 190, rotator 210 and front-end 194) can be configured to let the signal pass through them without processing, i.e., to self-bypass. Thus, with proper configuration, the signal at the output of unit 170 can be configured for insertion (subtraction) at any desired point in the second demodulator.

For example, if SigOut comprises decoded bits, it is typically provided to FEC encoder 174. If SigOut comprises soft or hard symbols, it is typically provided to shaping-filter/IFFT (Inverse FFT) module 186. If SigOut comprises samples extracted before the matched filter/FFT, it is typically provided to resampler 190.

In some embodiments, interference regeneration unit 170 accepts a frequency error and a timing-clock estimate from each demodulator (i.e., from the demodulator of the desired signal and from the demodulator of the interfering signal), as well as a common clock and reset signal from the common reference unit (e.g., reference unit 84 of FIG. 2). Based on these inputs, the interference regeneration unit aligns the frequency and timing of signal EstInt so as to match the frequency and timing of the signal received in the second receiver (i.e., the signal from which EstInt is to be subtracted). The alignment may comprise relative timing-clock alignment according to the timing-clock estimates from both receivers, relative frequency offset according to the frequency error estimations from both receivers, relative phase offset, relative timing offset, relative gain and/or relative channel response (relative Inter-Symbol Interference—ISI).

In a typical flow, unit 170 chooses between SigOut1 and SigOut2 as the input signal (i.e., chooses whether to take the input signal from the first or the second receiver) and generates an estimated interference signal EstInt that is provided to the other receiver. FEC encoder 174 encodes the data bits with a FEC, to produce encoded bits. Interleaver 178 re-orders the data. Interleaver 178 may operate on bits or on symbols. If operating on symbols, the interleaver is typically placed after mapper 182, and not before the mapper as shown in FIG. 4.

Mapper 182 converts the bits into symbols according to the constellation of the modulation type used. Module 186 applies pulse shaping or IFFT. Pulse shaping is typically applied when using single-carrier modulation. In these embodiments, module 186 shapes the symbols according to the pulse shape of the applicable air interface (e.g., a squared root raised cosine pulse according to the DVB-S2 standard). In some embodiments, module 186 also interpolates the shaped signal. Module 186 typically applies IFFT when using OFDM or OFDMA. In these embodiments, module 186 converts the symbols from the frequency domain to the time domain, and possibly also interpolates the converted signal.

Resampler 190 accepts the timing-clock estimates from the first and second receivers (e.g., Tf in FIG. 3, denoted $T_{f1}$ and $T_{f2}$ in FIG. 4). Resampler 190 is also controlled by the same reference clock as the first and second receivers. Based on the timing clock estimations, resampler 190 compensates for the relative different timing-clock rates of the desired signal and the interfering signal. This timing-clock offset is typically caused because the transmitters of the desired and interferer signals are not driven by the same clock and therefore are not aligned.

Resampler 190 may also compensate for the relative latency between the two signals. In another embodiment, resampler 190 may assume fixed and known delays between the SigOut extraction point in the first receiver and the location of interference cancellation (subtraction point) in the second receiver. Based on this information, the resampler determines at which sampling times to resample the input signal, and resamples the signal so as to correct the relative timing delay. Possible implementations of resampler 190 may comprise, for example, linear interpolation, cubic interpolation or interpolation using filter bank. In some embodiments, a timing offset estimation module 192 adapts the signal latency, e.g., by correlating the Estint signal with the slicer input (Slicer_in) and finding the location of the correlation peak.

In some embodiments, unit 170 comprises a carrier phase estimation module 206 and a digital frequency & phase rotation module 210. Modules 206 and 210 adjust the phase and frequency of the regenerated signal in order to match it in phase and frequency to the signal received by the second demodulator. For this purpose, module 210 accepts the frequency error estimates from the first and second receivers (e.g., $C_f$ in FIG. 3, denoted $C_{f1}$ and $C_{f2}$ in FIG. 4). Modules 206 and 210 are also controlled by the common reference clock as the other timing and frequency conversions (e.g., LO signals) in the receivers.

Modules 206 and 210 are assumed to be aware of the nominal relative frequency offset between the center frequencies of the first and second receivers. Based on this information, modules 206 and 210 generate a complex carrier signal $e^{j\Delta fk} + \Delta p$, which is subsequently used to multiply the signal in order to correct the relative frequency error. The relative phase rotation Δp is calculated by phase estimation module 206. The phase estimation module trains in order to optimize Δp so as to minimize the resulting EVM in the second receiver.

In some embodiments, module 210 adapts the signal phase according to the rule:

$$P_{n+1} = P_n + \mu_k \cdot \begin{pmatrix} \text{Real}(Estint_k) \cdot \text{Image}(SlicerIn_k) \\ -\text{Imag}(Estint_k) \cdot \text{Real}(SlicerIn_k) \end{pmatrix} \quad [3]$$

wherein k denotes the index of the slicer symbols in the second receiver, and n denotes the index of the sample index at the input of module 210. The phase is typically updated at the first sample n after each time the slicer input and output are updated. The convergence factor $\mu_k$ may be constant, or it may vary (e.g., according to a predefined table) in order to accelerate convergence.

In another embodiment, the phase training may be performed according to the rule:

$$P_{n+1} = P_n + \mu_k \cdot \begin{pmatrix} \text{Real}(Estint_k) \cdot \text{Image}(SlicerIn_k - SlicerOut_k) \\ -\text{Imag}(Estint_k) \cdot \text{Real}(SlicerIn_k - SlicerOut_k) \end{pmatrix} \quad [4]$$

In yet another embodiment, the phase training may be done according to the rule:

$$P_{n+1} = P_n + \mu_k \cdot \begin{pmatrix} \text{Real}(Estint_k) \cdot \text{Image}(SlicerIn_k - SlicerOut_k + Estint_k) \\ -\text{Imag}(Estint_k) \cdot \text{Real}(SlicerIn_k - SlicerOut_k + Estint_k) \end{pmatrix} \quad [5]$$

In some embodiments, digital front end module 194 converts the signal rate of the input signal SigOut to the required rate of the output signal EstInt. Module 194 may perform up-sampling or down-sampling, depending on the ratio between the input and output rates. Up-sampling or down-sampling may be performed in a single stage or in multiple stages in order to reduce implementation complexity.

Gain estimation module 214 estimates and corrects the relative gain, denoted g, between the estimated interference signal and the gain of the second receiver. The gain estimation module typically trains in order to optimize g so as to minimize the resulting EVM in the second receiver. The gain correction may be real (as opposed to complex), since the signal phase is corrected separately by modules 206 and 210. Alternatively, the gain correction may be complex, in which case the phase estimation module may be omitted.

In some embodiments, module 214 adapts the relative gain according to the rule:

$$g_{n+1} = g_n + \mu_k \cdot \begin{pmatrix} \text{Real}(Estint_k) \cdot \text{Real}(SlicerIn_k - SlicerOut_k) + \\ \text{Imag}(Estint_k) \cdot \text{Image}(SlicerIn_k - SlicerOut_k) \end{pmatrix} \quad [6]$$

wherein k denotes the index of the slicer symbols in the second receiver, and n denotes the index of the sample index at the input of the gain multiplier used by module 214 to adjust the gain. The gain is typically updated at the first sample n after each time the slicer input and output are updated. The convergence factor $\mu_k$ may be constant, or it may vary (e.g., according to a predefined table) in order to accelerate convergence.

Equalizer 198 typically comprises a time-domain filter, e.g., a Finite Impulse Response (FIR) or Infinite Impulse Response (IIR) filter. The filter typically trains in order to optimize the filter coefficients so as to minimize the resulting EVM in the second receiver. The filter coefficients may be real or complex. The filter may comprise a fixed main tap equal to unity, since gain correction and phase correction are performed separately by modules 206 and 214. Alternatively, the filter may comprise a complex main tap having a variable amplitude. In this embodiment, modules 206 and 214 may be omitted.

In some embodiments, equalizer 198 is adapted according to the following rule:

$$\bar{c}_{n+1} = \bar{c}_n \mu_k \cdot (SlicerIn_k) \cdot \bar{z}_n * \bar{c}_{n+1}(\text{Main tap}) = 1 \quad [7]$$

wherein $\bar{c}_k$ denotes the vector of FIR coefficients, $\bar{z}_k$ denotes the delay line of the FIR filter, k denotes the index of the slicer symbols in the second receiver, and n denotes the index of the sample index at the FIR input.

Since n and k are not necessarily aligned and are not necessarily with the same rate, the equalizer coefficients may be updated at the first n sample after each time the slicer input and output are updated. Alternatively, the equalizer coefficients may be updated at each n sample according to the last slicer input and output updates. Further alternatively, the equalizer coefficients may be updated at the first k sample after each time the delay line is updated. As another example, the equalizer coefficients may be updated at each k sample according to the last delay line update. The convergence factor $\mu_k$ may be constant, or it may vary (e.g., according to a predefined table) in order to accelerate convergence.

In another embodiment, the equalizer training may be done according to the rule:

$$\bar{c}_{n+1} = \bar{c}_n + \mu_k \cdot (SlicerIn_k - SlicerOut_k) \cdot \bar{z}_n * \bar{c}_{n+1}(\text{Main tap}) = 1 \quad [8]$$

BPF 202 performs band-pass filtering that limits the signal that is provided to the second receiver to the frequency band of the desired signal. In some embodiments the BPF can be incorporated within equalizer 198. In alternative embodiments, however, the BPF and equalizer are implemented separately in order to simplify the implementation of the equalizer. When the first receiver operates in bursts, the interference re-generation module typically outputs a zero signal during time periods that are between bursts.

Cancellation of Multiple Interfering Signals

The receiver and interference regeneration module configurations described herein can be generalized to the case of multiple interfering signals that cause interference to a certain desired signal.

Figure 5:
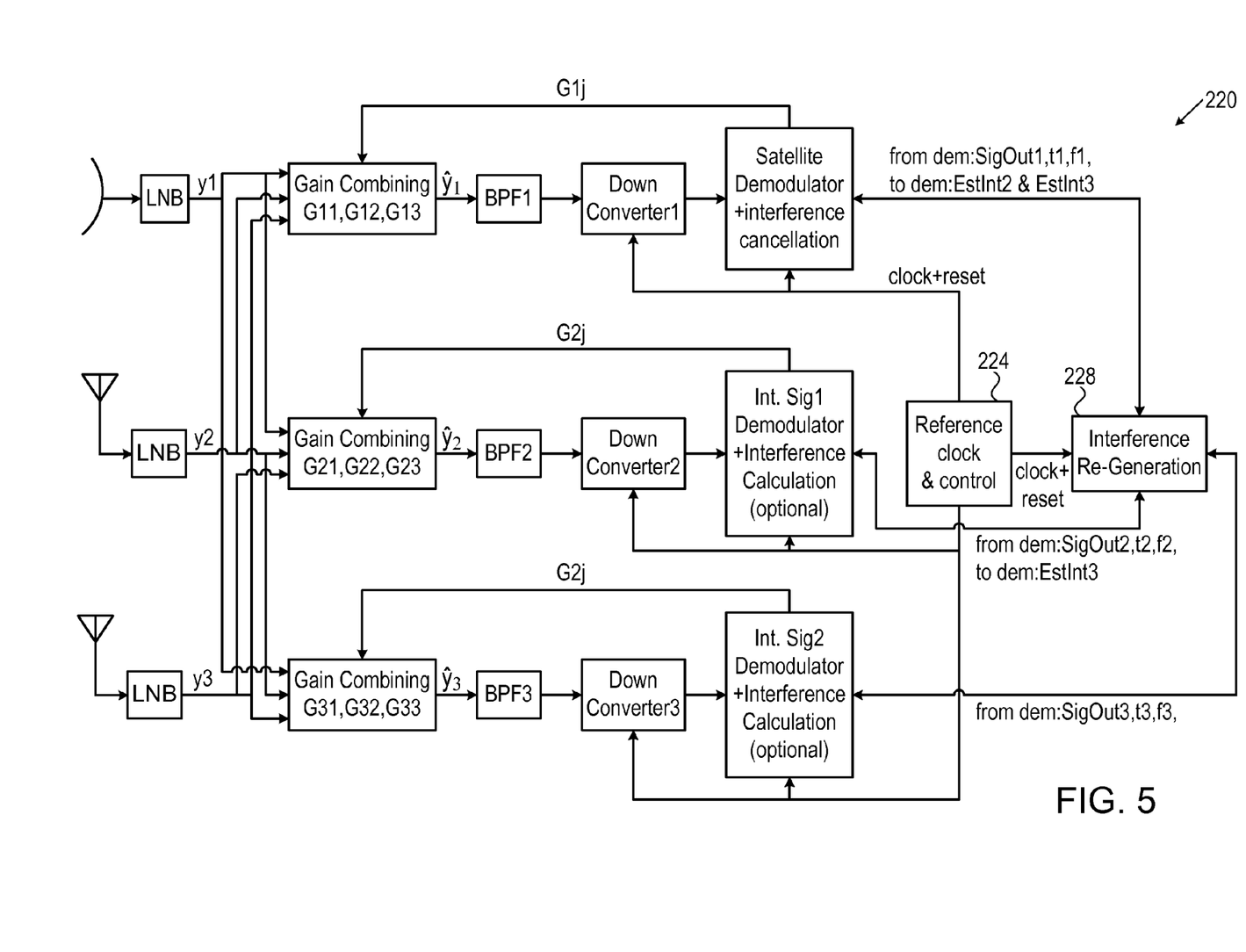
FIG. 5 is a block diagram that schematically illustrates an interference-canceling receiver, in accordance with an alternative embodiment of the present invention.

FIG. 5 is a block diagram that schematically illustrates an interference-canceling receiver 220, in accordance with an alternative embodiment of the present invention. In the present example, receiver 220 comprises three reception paths for receiving a desired satellite signal and two interfering signals. The reception paths are similar in structure and functionality to the reception paths shown in FIG. 2 above.

Receiver 220 comprises a reference unit 224, which is similar to unit 84, but provides reference timing and clock signals to three reception paths instead of two. Receiver 220 comprises an interference regeneration unit 228, which is described in greater details below. Although the embodiment of FIG. 5 addresses two interfering signals for the sake of clarity, the disclosed techniques can be used to implement receivers that cancel any desired number of interfering signals.

In the present example, the second interfering signal (denoted IntSig2 in the figure) is decoded first, the estimated second interfering signal is subtracted from the first interfering signal (denoted IntSig1 in the figure) and the first interfering signal is decoded. Then, the estimates of the first and second interfering signals are subtracted from the desired (satellite) signal and the satellite signal is decoded. Alternatively, any other suitable decoding order can also be used.

Another alternative is to decode the first and second interfering signals first, each interfering signal decoded separately without successive interference cancellation, and then to remove both interfering signals from the desired signal path. In other words, successive interference cancellation on the interfering signal paths is optional and not a must.

For canceling more than two interfering signals, a certain decoding order is set. At each stage of the decoding process, the estimated interference from all the receivers that have been decoded so far is subtracted from all the signals yet to be decoded, with proper adjustments of the interference regeneration module.

The order in which the interfering signals are decoded may be set according to any suitable criterion. For example, the decoding order may be set arbitrarily, e.g., at random, based on the EVM at each receiver (e.g., receivers with better EVM are decoded first, or receivers with worse EVM are decoded first), based on the BER measure in each receiver (e.g., receivers with better BER are decoded first, or receivers with worse BER are decoded first), or according to any other suitable order. Regardless of the decoding order, the desired (satellite) signal is typically decoded last.

Figure 6:
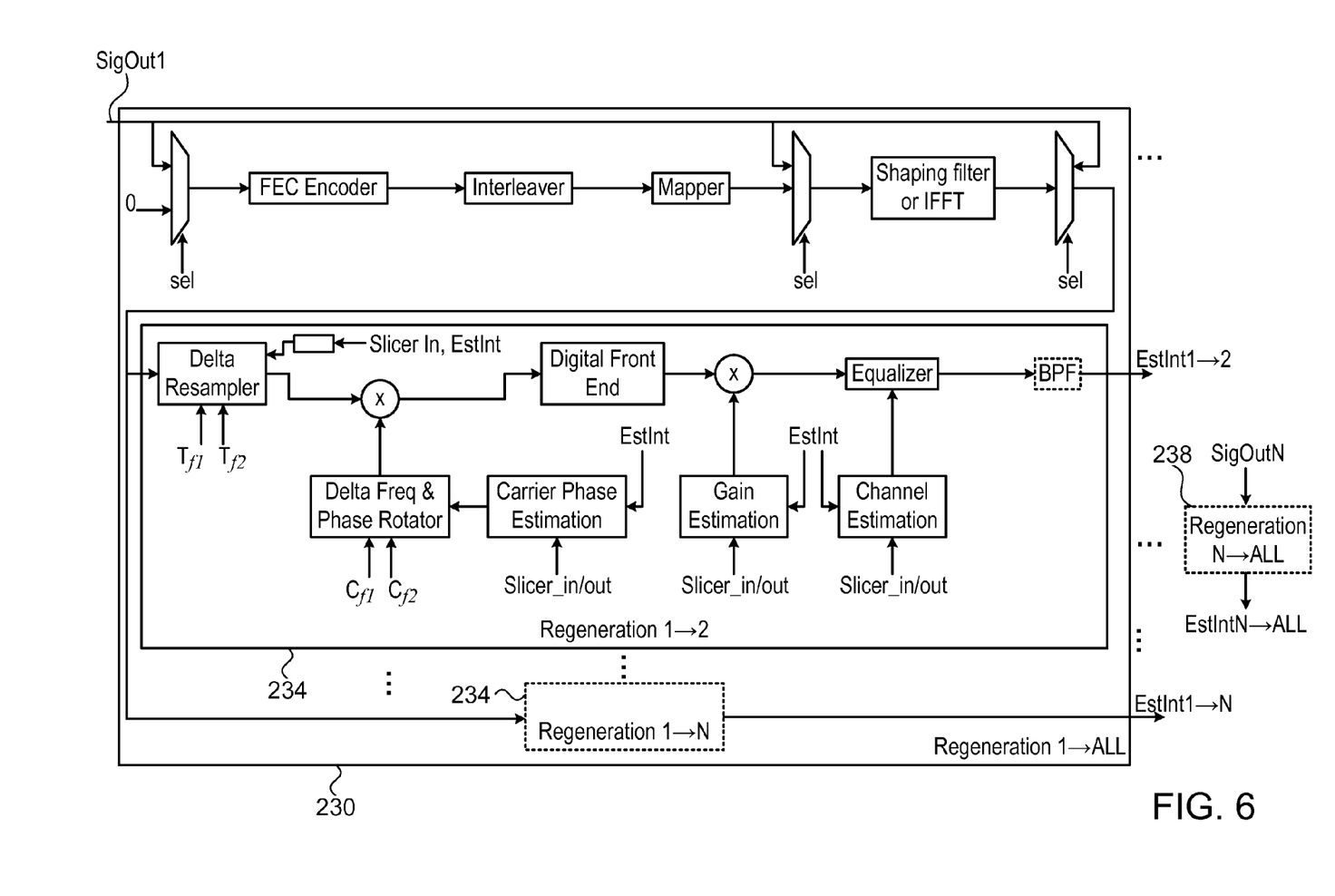
FIG. 6 is a block diagram that schematically illustrates an interference regeneration unit, in accordance with an alternative embodiment of the present invention.

FIG. 6 is a block diagram that schematically illustrates an interference regeneration unit 230, which performs interference regeneration for N interfering signals, in accordance with an alternative embodiment of the present invention. Unit 230 accepts a SigOut signal from one of the N receivers, and generates interference estimation signals to the remaining N−1 receivers. As can be seen in the figure, some of the regeneration path is common to the N−1 signals, and some of the path is duplicated N−1 times using N−1 regeneration modules 234.

Unit 230 accepts signal SigOut1 as input, and generates the interference cancellation signals for receivers 2, 3, 4 . . . N. A similar unit should be used for generating the interference cancellation signals for receivers 1, 3, 4 . . . N from SigOut2. In other words, unit 230 is duplicated N times. The $N^{th}$ duplicate is denoted 238 in the figure.

The configuration of FIG. 6 supports any decoding order i.e., interference cancellation from any receiver to any other receiver. In alternative embodiments, a simplified configuration can be implemented by limiting the decoding order. For example, interference cancellation from the satellite receiver to other receivers can be omitted if the desired signal is decoded last.

For supporting the scheme of FIG. 6, each demodulator may be similar to demodulator 92 of FIG. 3 above, with a slight modification that enables the demodulator to accept and subtract multiple interfering signal estimates. Such a demodulator may combine (e.g., sum) the interfering signal estimates, and then add the combined interfering signal into the reception path of the desired signal. Alternatively, the demodulator may comprise separate logic for each estimated interference signal, such that the demodulator is able to add each interfering signal at a different location.

The configurations of the receivers, demodulators and interference regeneration units shown in FIGS. 1-6 above are example configurations which are chosen purely for the sake of conceptual clarity. In alternative embodiments, any other suitable configurations can also be used. For example, the partitioning of functions among the different elements may be modified in any suitable way. Some receiver elements that are not mandatory for understanding of the disclosed techniques, such as DC offset removal and I/Q mismatch correction elements, are omitted from the figured for the sake of clarity.

The different receiver, demodulator and interference regeneration unit components described herein can be implemented in hardware, such as using one or more discrete components, Field-Programmable Gate Arrays (FPGAs), Application-Specific Integrated Circuits (ASICs) or Radio Frequency Integrated Circuits (RFICs). Alternatively, some receiver, demodulator and interference regeneration unit components can be implemented in software or using a combination of hardware and software elements.

Reception Method Description

Figure 7:
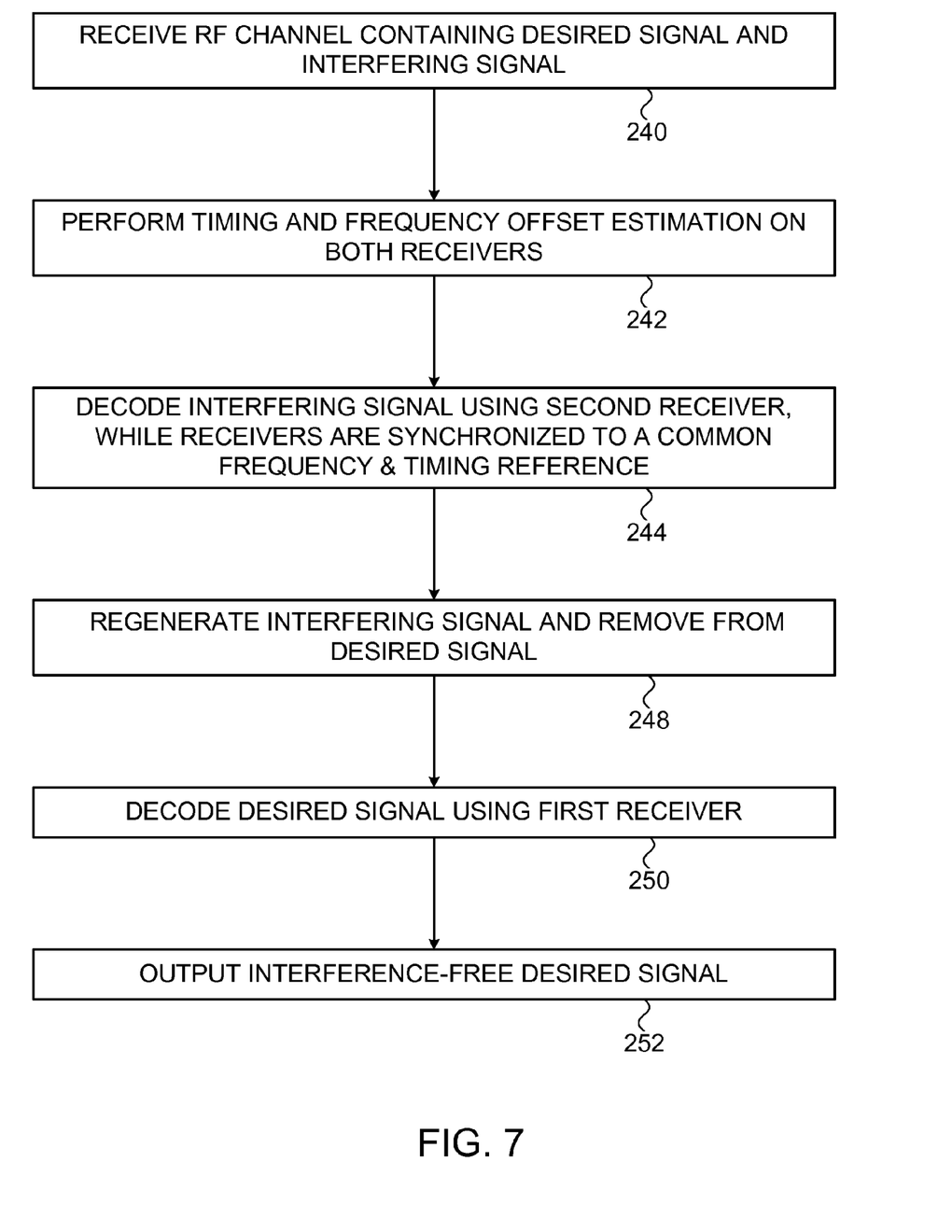
FIG. 7 is a flow chart that schematically illustrates a method for reception using interference cancellation, in accordance with an embodiment of the present invention.

FIG. 7 is a flow chart that schematically illustrates a method for reception using interference cancellation, in accordance with an embodiment of the present invention. The method begins with a front end of an interference-canceling receiver (e.g., receiver 36, 58 or 220) receiving an RF channel that contains a desired signal and an interfering signal, at a reception step 240.

In the interference-canceling receiver, the two receivers perform an acquisition phase in which each receiver estimates the timing clock offset and carrier frequency offset in each respective signal, at an acquisition step 242. This estimation is typically possible even before performing interference cancellation, for example since it is usually based on pilot signals that are resilient to interference. At this stage, the two receivers are synchronized to a common frequency and timing reference.

In the interference-canceling receiver, the interfering signal receiver decodes the interfering signal, at an interfering signal decoding step 244. An interference regeneration unit extracts the interfering signal from a certain point in the interfering signal receiver, and regenerates a version of this signal that is matched in time and frequency to the desired signal received by the desired signal receiver, at a regeneration step 248. The interference regeneration unit provides the regenerated signal to the desired signal receiver, and the desired signal receiver subtracts this signal from the desired signal. The desired signal receiver decodes the interference-free desired signal, at a desired signal decoding step 250, and provides the interference-free desired signal as output.

Although the embodiments described herein mainly address satellite communication systems, the methods and systems described herein can also be used in other applications, such as in Wireless Local Area Networks (WLAN), WiMAX communication systems, Long Term Evolution (LTE) communication systems, or any other suitable communication application.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method for communication, comprising:
   receiving a Radio Frequency (RF) channel containing a desired signal conforming to a first air interface and an interfering signal conforming to a second air interface;
   synchronizing a first receiver that is configured for the first air interface and a second receiver that is configured for the second air interface to a common frequency and timing reference; and
   while the first and second receivers are synchronized, decoding the desired signal from the RF channel using the first receiver to generate a first output, decoding the interfering signal from the RF channel using the second receiver to generate a second output, and reconstructing the desired signal while suppressing the interfering signal by jointly processing the first and second outputs.

2. The method according to claim 1, wherein the second air interface is different from the first air interface.

3. The method according to claim 1, wherein jointly processing the first and second outputs comprises processing the second output so as to generate an adjusted second output that matches the first output in time and frequency, and combining the adjusted second output with the first output.

4. The method according to claim 3, wherein processing the second output comprises accepting from the first and second receivers timing and frequency estimates regarding the desired signal and the interfering signal, respectively, and adjusting the second output based on the timing and frequency estimates.

5. The method according to claim 4, wherein jointly processing the first and second outputs further comprises processing the first output so as to generate an adjusted first output that matches the second output in time and frequency, and combining the adjusted first output with the second output.

6. The method according to claim 5, wherein jointly processing the first and second outputs comprises evaluating a selection criterion in order to select between:
   a first order, in which the adjusted first output is initially generated and combined with the second output, and then the adjusted second output is generated and combined with the first output; and
   a second order, in which the adjusted second output is initially generated and combined with the first output, and then the adjusted first output is generated and combined with the second output.

7. The method according to claim 5, wherein jointly processing the first and second outputs comprises alternating between adjustment of the first output and adjustment of the second output until meeting a termination criterion.

8. The method according to claim 1, wherein decoding the desired signal comprises producing a first weighted sum of multiple replicas of the RF channel received via multiple respective antennas and providing the first weighted sum as input to the first receiver, and wherein decoding the interfering signal comprises producing a second weighted sum of the multiple replicas of the RF channel and providing the second weighted sum as input to the second receiver.

9. The method according to claim 1, wherein reconstructing the desired signal comprises extracting the interfering signal from an extraction point selected from a group of extraction points in the second receiver, and removing the extracted interfering signal from the desired signal at a cancellation point selected from a set of cancellation points in the first receiver.

10. The method according to claim 1, wherein the desired signal is received from a satellite, and wherein the interfering signal is received from a terrestrial communication system.

11. The method according to claim 1, wherein receiving the RF channel comprises receiving two or more interfering signals in addition to the desired signal, wherein decoding the interfering signal comprises decoding the two or more interfering signals using two or more respective second receivers that are synchronized to the common frequency and timing reference, to produce two or more second outputs, and wherein jointly processing the first and second outputs comprises reconstructing the desired signal while suppressing the two or more interfering signals.

12. The method according to claim 11, wherein jointly processing the first and second outputs comprises selecting an order among the second outputs based on an ordering criterion, and combining the second outputs with the desired signal in accordance with the selected order.

13. A communication apparatus, comprising:
   a front end, which is configured to receive a Radio Frequency (RF) channel containing a desired signal conforming to a first air interface and an interfering signal conforming to a second air interface;
   a first receiver, which is configured to reconstruct the desired signal from the RF channel by decoding the first air interface, to produce a first output;
   a second receiver, which is configured to reconstruct the interfering signal from the RF channel by decoding the second air interface, to produce a second output;
   a reference unit, which is configured to synchronize the first and second receivers to a common frequency and timing reference; and
   an interference regeneration unit, which is configured to provide the second output to the first receiver, and to cause the first receiver to reconstruct the desired signal while suppressing the interfering signal.

14. The apparatus according to claim 13, wherein the second air interface is different from the first air interface.

15. The apparatus according to claim 13, wherein the interference regeneration unit is configured to process the second output so as to generate an adjusted second output that matches the first output in time and frequency, and wherein the first receiver is configured to combine the adjusted second output with the first output.

16. The apparatus according to claim 15, wherein the interference regeneration unit is configured to accept from the first and second receivers timing and frequency estimates regarding the desired signal and the interfering signal, respectively, and to adjust the second output based on the timing and frequency estimates.

17. The apparatus according to claim 16, wherein the interference regeneration unit is further configured to process the first output so as to generate an adjusted first output that matches the second output in time and frequency, and wherein the second receiver is configured to combine the adjusted first output with the second output.

18. The apparatus according to claim 17, wherein the interference regeneration unit is configured to evaluate a selection criterion in order to select between:
   a first order, in which the adjusted first output is initially generated and combined with the second output, and then the adjusted second output is generated and combined with the first output; and
   a second order, in which the adjusted second output is initially generated and combined with the first output, and then the adjusted first output is generated and combined with the second output.

19. The apparatus according to claim 17, wherein the interference regeneration unit is configured to alternate between adjustment of the first output and adjustment of the second output until meeting a termination criterion.

20. The apparatus according to claim 13, and comprising a first gain combining unit that is configured to produce a first weighted sum of multiple replicas of the RF channel received via multiple respective antennas and to provide the first weighted sum as input to the first receiver, and a second gain combining unit that is configured to produce a second weighted sum of the multiple replicas of the RF channel and to provide the second weighted sum as input to the second receiver.

21. The apparatus according to claim 13, wherein the second receiver and the interference regeneration unit are configured to extract the interfering signal from an extraction point selected from a group of extraction points in the second receiver, and wherein the first receiver and the interference regeneration unit are configured to remove the extracted interfering signal from the desired signal at a cancellation point selected from a set of cancellation points in the first receiver.

22. The apparatus according to claim 13, wherein the front end is configured to receive the desired signal from a satellite and to receive the interfering signal from a terrestrial communication system.

23. The apparatus according to claim 13, wherein the front end is configured to receive two or more interfering signals in addition to the desired signal, wherein the second receiver comprises two or more second receivers that are synchronized to the common frequency and timing reference and are respectively configured to decode the two or more interfering signals so as to produce two or more second outputs, and wherein the interference regeneration unit is configured to provide the two or more second outputs to the first receiver, so as to cause the first receiver to reconstruct the desired signal while suppressing the two or more interfering signals.

24. The apparatus according to claim 23, wherein the interference regeneration unit is configured to select an order among the second outputs based on an ordering criterion, and to cause the first receiver to combine the second outputs with the desired signal in accordance with the selected order.

* * * * *